United States Patent
Beuhler et al.

(10) Patent No.: US 6,860,350 B2
(45) Date of Patent: Mar. 1, 2005

(54) CMOS CAMERA WITH INTEGRAL LASER RANGING AND VELOCITY MEASUREMENT

(75) Inventors: Allyson Beuhler, Downers Grove, IL (US); Francisco Castro, St. Charles, IL (US); Anthony Polak, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 88 days.

(21) Appl. No.: 10/325,124

(22) Filed: Dec. 20, 2002

(65) Prior Publication Data

US 2004/0118624 A1 Jun. 24, 2004

(51) Int. Cl.$^7$ ................................. B62D 1/24
(52) U.S. Cl. .................. 180/167; 180/169; 180/170; 356/27; 356/28.5
(58) Field of Search .................. 180/169, 167, 180/168, 170; 342/70, 172, 192; 256/28.5, 28, 27

(56) References Cited

U.S. PATENT DOCUMENTS

| | | | | |
|---|---|---|---|---|
| 4,299,484 A | * | 11/1981 | Holzapfel | 356/28.5 |
| 4,403,220 A | * | 9/1983 | Donovan | 342/29 |
| 4,413,905 A | * | 11/1983 | Holzapfel | 356/28 |
| 4,552,456 A | * | 11/1985 | Endo | 356/28.5 |
| 4,743,110 A | | 5/1988 | Arnaud et al. | |
| 2001/0045981 A1 | | 11/2001 | Gloger et al. | |

* cited by examiner

*Primary Examiner*—Hau Phan
(74) *Attorney, Agent, or Firm*—Brian M. Mancini

(57) ABSTRACT

The invention provides a method and system for adjusting vehicle speed, beginning with a modulated laser pulse being emitted. A reference portion of the emitted modulated laser pulse is extracted, a reflected portion of the emitted modulated laser pulse is received, and the reflected portion is combined with the reference portion on a portion of an imaging array. A determination of a relative velocity is based on the combined reflected portion and reference portion.

15 Claims, 5 Drawing Sheets

FIG. 9

CMOS CAMERA WITH INTEGRAL LASER RANGING AND VELOCITY MEASUREMENT

FIELD OF THE INVENTION

This invention relates generally to methods and related devices for determining velocity and distance. In particular, the invention relates to a method, system and apparatus for determining velocity and distance based on integral laser ranging and velocity measurements with a CMOS camera.

BACKGROUND OF THE INVENTION

Range finders employing laser radar are being developed for automotive applications such as adaptive cruise control (ACC), an expansion of existing cruise control systems that maintain vehicle speed and separation through a link to the powertrain of a vehicle. A vehicle equipped with ACC usually employs a radar sensor mounted in the front of the vehicle to help maintain a safe cruising distance between itself and a vehicle that it is following. That distance interval, which may be set by an ACC system, guides the acceleration and braking of a vehicle to maintain a proper distance between vehicles. Some systems can compensate for hilly terrain and passing situations.

Currently Lidar systems (LIght Detection And Ranging), i.e. laser range-finding devices, are being used in laser telemetry applications such as ACC to determine the distance of an object from a time-of-flight measurement. Traditional Lidar detection schemes are based on a pulsed or continuous wave laser emitter and a discrete solid-state detector. Transmitting and receiving electromagnetic radiation at a higher frequency than radar, a Lidar system can operate in the ultraviolet, visible and infrared regions of the electromagnetic spectrum. With visible light, the time-of-flight for distances of 50 to 200 meters is typically short (e.g., 167 to 667 nanoseconds to the target vehicle and a similar time for the echo to reach the detector) so that high-speed detectors are needed to capture the signal from the Lidar system.

One approach to velocity and distance detection schemes, described in U.S. Pat. No. 4,743,110 to Arnaud et al., modulates a frequency of an outgoing beam, above and below some reference frequency, and then recombines a Doppler-shifted echo with a reference beam at a photodetector. Another example of current range-finding technology, disclosed in published patent application U.S. 2001/0045981 A1 to Gloger et al., is a method and device for detecting road users and obstacles on the basis of camera images and a distance-measuring sensor such as a radar sensor.

Traditional coherent Lidar detection schemes do not modulate the outgoing laser beam. Since the outgoing beam is not modulated, the beat frequency is typically in the 10's–100's of THz range. This beat frequency can be measured with a high-speed photodiode or photodetector, although it may be too fast to measure with a photoarray of a charge-coupled device (CCD) or complementary metal oxide semiconductor (CMOS) camera. Thus, the above-mentioned system with a camera still requires a separate light-sensing detector.

It would be beneficial to have an alternative and simplified range-finding system that could use a low-cost camera, and would not require a separate laser detector. There are difficulties, however, in creating such a system. For example, silicon photodiodes in a CMOS digital camera are good photodetectors in the near infrared and visible light, however, the typical integration time of a camera pixel element may be several orders of magnitude longer than the time-of-flight signal from a laser-ranger finder, an integration time much too slow for conventional Lidar sensing.

It is an object of this invention, therefore, to provide a method, system and device for calculating velocity and distance based on integral laser ranging and velocity measurements from a photodetector imaging array without a separate Lidar detector. The invention will overcome the problem of slow integration time, as well as other the deficiencies and obstacles described above.

SUMMARY OF THE INVENTION

One aspect of the invention provides a method and system for adjusting vehicle speed, beginning with a modulated laser pulse being emitted. A reference portion of the emitted modulated laser pulse is extracted, a reflected portion of the emitted modulated laser pulse is received, and the reflected portion is combined with the reference portion on a portion of an imaging array. A determination of the relative velocity is based on the combined reflected portion and reference portion.

Another aspect of the invention provides a CMOS camera system with integral laser ranging. The CMOS camera system comprises a semiconductor laser, a partially reflective mirror, a CMOS imaging array, and a controller operably coupled to the laser and the CMOS imaging array. A relative velocity is determined based on the extracted portion and the reflected portion of a modulated laser pulse from the semiconductor laser.

Another aspect of the invention provides an adaptive cruise control for a vehicle. The adaptive cruise control includes a semiconductor laser, a partially reflective mirror, a CMOS imaging array, a controller, and a cruise control module. A relative velocity is determined based on the extracted portion and a reflected portion of the modulated laser pulse, and a relative velocity signal may be sent from the controller to the cruise control module to adjust the vehicle speed.

The present invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The foregoing aspects and other attendant advantages of the present invention will become more readily appreciated by the detailed description taken in conjunction with the accompanying drawings.

DETAILED DESCRIPTION OF THE PRESENTLY PREFERRED EMBODIMENTS

The present invention provides a method and system for adjusting vehicle speed, using a CMOS camera with integral laser ranging and velocity measurement capability. The CMOS camera with integral laser ranging and velocity measurement may be used in an adaptive cruise control for a mobile vehicle, allowing a real-time measurement of the relative velocity between, for example, a leading vehicle and a following vehicle. The relative velocity measurements may be used to determine whether a vehicle positioned in front is traveling at a faster or a slower speed than the following vehicle. The relative velocity determination may be used to adjust the vehicle speed by sending a relative velocity signal to a cruise control module in the trailing vehicle.

An intensity-modulated laser is combined with an imaging array such as an addressable CMOS photodiode or photodetector array to measure velocity at one or more points in an object field. Rather than sending a pulse of infrared light with a frequency on the order of 1E14 Hz from the laser, the light emitted from the laser is intensity modulated at a much lower frequency, for example, at a frequency between 10 MHz and 1000 MHz. The modulation waveform may be sinusoidal, triangular, sawtooth, square, or any suitable shape for detection by the photodetector array. The light emitted from the laser becomes a carrier with an amplitude-modulated or intensity-modulated signal on it. A portion of the emitted modulated laser pulse is diverted to the imaging array, referred to herein as the reference portion, and the remainder of the pulse is directed towards the target. When the outgoing light beam strikes a moving target, the reflected beam is Doppler shifted and displaced in time (phase) relative to the reference. Though the carrier frequency is Doppler or phase-shifted along with the modulated signal, the phase-shifted signal may be mixed or combined with the reference signal or reference portion to create a waveform or wavepacket with a beat frequency proportional to the relative velocity of the target. The beat frequency is related to the outgoing modulation frequency, rather than to the carrier frequency. Careful selection of the modulation frequency results in a beat frequency between the reference portion and the reflected portion that can be readily measured by the photodetector imaging array in the camera.

The reference portion and the reflected portion may be combined at one or more pixels within the imaging array. In one embodiment, a single pixel may be used as the detector where the reference portion and the reflected portion are combined. In another embodiment, a linear array of pixels may be used as detectors, allowing relative velocity determinations to be made over a linear array of target points. In yet another embodiment, a group of pixels may be used as detectors, the output from the pixels being averaged to provide higher signal-to-noise ratio. In still another embodiment, a portion of the imaging array may be used as detectors to provide relative velocity imaging of the target. In a further embodiment, the entire imaging array may be used as detectors to provide relative velocity imaging, improved signal-to-noise ratio, or some combination thereof.

The photodetector imaging array may be used as in a standard camera configuration to provide electronic imaging of the target objects. An image may be generated with the imaging array, and a portion or the entire imaging array may be used to determine a relative velocity or a relative velocity image of the target objects.

Signals from the camera may be used to determine the relative velocity of the target objects. In the case of mobile vehicles, the relative velocity between a leading mobile vehicle and a trailing mobile vehicle may be determined, and a signal sent to a cruise control module in the trailing vehicle when it is determined that the trailing vehicle should be slowed or sped up. The images from the camera may be used to ascertain that the target object is indeed a vehicle from which to adjust the cruise control, or to provide a visual or audio alert for some other condition. In other applications, the camera may be used to alert the driver of other vehicles and objects behind the vehicle, in blind spots, or in adjacent lanes.

The range of the target object may be determined using the modulated laser pulse and the imaging array, for example, by determining the time of arrival of the first beat resulting from the emitted or reference laser pulse and the reflection of the emitted laser pulse from the target object. In the case of mobile vehicles, the distance between the leading vehicle and the trailing vehicle, or any other distance of interest, may be determined. An image from the imaging array may be processed with the distance information to ascertain the distance to select objects of interest.

Figure 1:
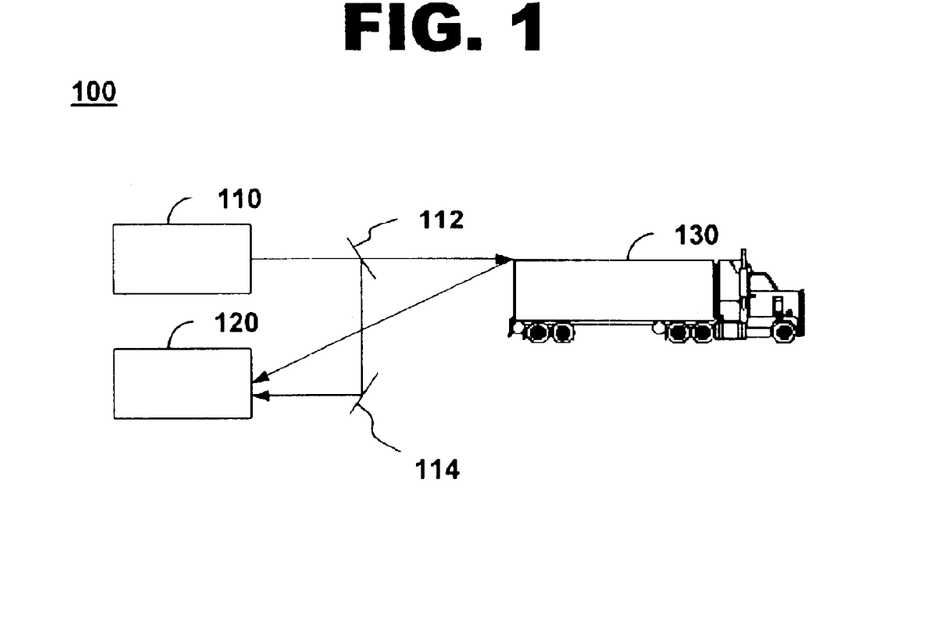
FIG. 1 illustrates one embodiment of a system for adjusting vehicle speed, in accordance with the current invention.

FIG. 1 illustrates one embodiment of a system for adjusting vehicle speed, in accordance with the present invention at 100. Vehicle speed adjustment system 100 includes at least one laser diode 110, an extractive optical element 112, a reflective mirror 114, and a photodetector or photodiode imaging array 120. Vehicle speed adjustment system 100 may be used to determine range information and relative velocity between the system and a target object such as a mobile vehicle 130.

Laser diode 110 may be any suitable laser for emitting modulated pulses of light. Laser diode 110 may be any standard edge-emitting laser diode or vertical-cavity surface-emitting laser (VCSEL). Laser diode 110 may be comprised of a direct band-gap material such as gallium nitride, aluminum phosphide, gallium aluminum phosphide, gallium arsenide, indium phosphide, and indium arsenide. Light emitted from laser diode 110 may be pulsed, for example, by turning the voltage driving the laser on and off, or by varying the drive current between a light-emitting level and anon-emitting level. Light emitted from laser diode 110 may be modulated, for example, by modulating the drive voltage or drive current with an amplitude-modulated signal generated by a controller or other suitable drive electronics. Laser diode 110 may be operated in a continuous mode, where the output is amplitude modulated, or in a pulsed mode where light is emitted with very small duty cycles so that higher optical power can be reached. When pulsed, the emitted light may also be modulated at the desired frequency. The desired frequency may be selected such that the relative velocity can be readily measured with a relatively slow photodiode imaging array. Modulation frequencies between 100 MHz and 500 MHz may be adequate for many applications, though frequencies above and below this range may also be used. The modulated laser pulse may be amplitude modulated at a frequency between 10 MHz and 1000 MHz. The light emitted by laser diode 110 may have a wavelength between 300 nanometers and 1100 nanometers, including visible light, infrared light, or ultraviolet light. Laser diode 110 may be positioned such that a portion of the light emitted from the laser may be directed towards a target object such as mobile vehicle 130, and a portion directed towards imaging array 120.

Focusing optics may be used to gather light from laser diode 110 and to direct it towards the target object. Extractive optical element 112 may be used to extract a portion of the emitted laser light. Extractive optical element 112 may be a thinly metallized glass window such as a partially silvered mirror, or a dielectric-coated piece of glass. Extractive optical element 112 may be an optical fiber, an optical waveguide, an optical grating, or any other optical element suitable for extracting a portion of the emitted laser light from laser diode 110. Extractive optical element 112 may transmit the majority of the light and extract the rest. In some implementations of the present invention, one percent or less of the emitted light is extracted.

Reflective mirror 114 or other suitable optical elements may direct the extracted laser light towards imaging array 120. The transmitted laser light may be reflected off the target object and be collected and focused on imaging array 120. The reflected portion may be combined with the reference portion on a section or the entirety of imaging array 120, from which relative velocity information, distance information and imaging information may be determined.

Imaging array 120 may be a charge-coupled device (CCD), a complementary metal-oxide-semiconductor (CMOS) photodetector imaging array, a linear or rectangular array of photodetectors, or any suitable detector array for detecting reflected laser light from the target object. Imaging array 120 may have individually addressable pixels for sensing the modulated light from laser diode 110 and the reflected light from the target object. Individual pixels, a group of pixels, or the entire pixel array may be used to detect the reflected and reference portions of the emitted modulated laser pulse. Imaging array 120 may comprise a custom or standard photodetector array. Imaging array 120 may include, for example, an array of 640×480 photodetectors, an array larger than 3 million total pixels, or any suitable array size for detecting images and generating signals for distance and relative velocity measurements.

Imaging array 120 may have a controllable integration time and an adjustable frame rate to achieve desired speed and distance resolution at satisfactory update rates.

Figure 2:
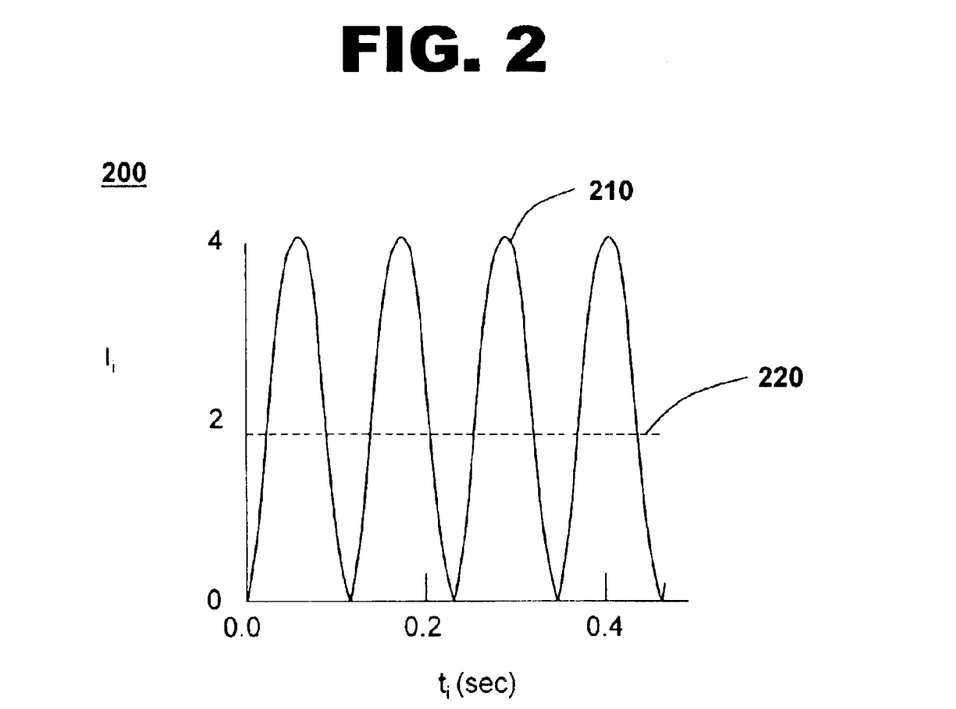
FIG. 2 shows a graph of the intensity of a reflected portion of an emitted modulated laser pulse combined with a reference portion of the emitted modulated laser pulse, in accordance with one embodiment of the current invention.

FIG. 2 shows a graph of the intensity of a reflected portion of an emitted modulated laser pulse combined with a reference portion of the emitted modulated laser pulse, in accordance with one embodiment of the present invention at 200.

Combined light portions 200 shows exemplary output from one or more pixels in an imaging array when a modulated laser light from a laser diode is combined with phase-shifted light from a target object. The phase-shifted light from the target object will heterodyne or beat with the reference light from the laser diode, resulting in a waveform 210 with undulations representing the relative velocity. With sinusoidally modulated laser pulses, the reflected light and reference light will also be sinusoidal, and the combined waveform will have a sine-squared waveform although the amplitude and modulation depth may vary depending on the relative intensities of the reflected and reference portions of the light. The beat frequency is dependent on the modulation frequency and the relative velocity between the target object and the source. As an example, if the relative velocity between a leading truck or automobile and the following vehicle were 5 m/sec (approximately 11 miles per hour), and the modulation frequency were 500 MHz, the beat frequency would be slightly less than 10 Hz. In order to measure this 10 Hz beat frequency, the sampling rate of the camera must be at least two times the frequency that is to be measured (the sampling rate must meet the Nyquest criterion), which in this case results in a sampling rate of 20 samples/sec. To achieve this sampling rate the frame rate of the camera must be at least 20 Hz, or the pixels in the camera must be sampled at 20 times per frame, or the combination of frame rate and the number of pixels sampled per frame must be at least 20. It can be seen that by properly choosing the modulation frequency and adjusting the sampling rate, a wide range of relative velocities can be measured. The period between each consecutive cycle provides a measure of the relative velocity. The period may be designed such that the shortest measured period, corresponding to the highest relative velocity, is longer than the access time or integration time of the imaging array.

A threshold level 220 may be set at a point between the maximum combined signal and the minimum combined signal. Threshold level 220 may be used to determine the period or time between consecutive cycles of the combined light. Crossings of threshold level 220 in the same direction by waveform 210 may be used to determine the period and hence the relative velocity, with larger relative velocities corresponding to shorter times between crossings, and smaller relative velocities corresponding to longer times between crossings. Negative and positive relative velocities may be ascertained by distance determinations at subsequent times. Threshold crossings may be determined at either positive-going crossings or negative-going crossings.

Figure 3:
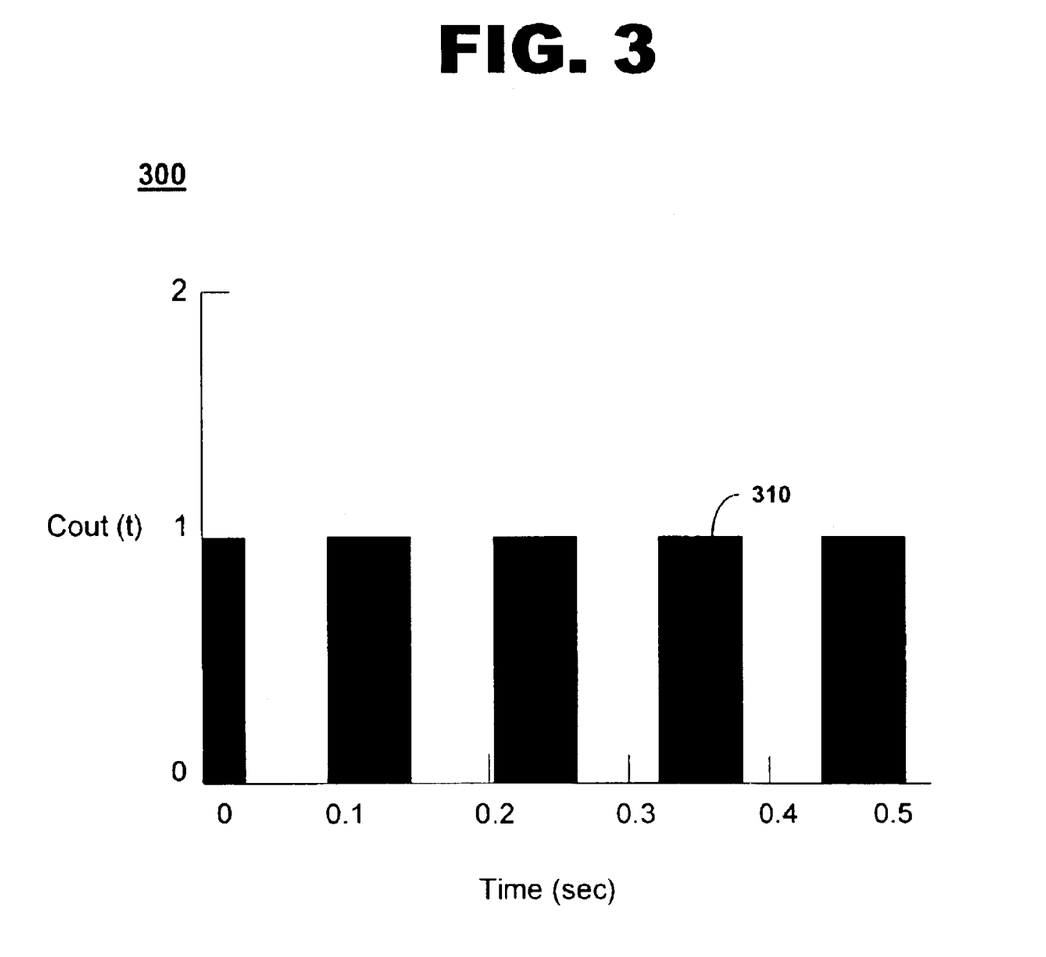
FIG. 3 shows a graph of an output from a threshold detector, in accordance with one embodiment of the current invention.

FIG. 3 shows a graph of an output from a threshold detector, in accordance with one embodiment of the present invention at 300.

Threshold detector output 300 shows a rectangular waveform 310 typical of a threshold detector with a periodic input signal, such that input voltages above a threshold voltage or threshold level result in a high output voltage, and input voltages below the threshold voltage result in a low output voltage. An input voltage corresponding to the combined reflected portion and reference portion of the emitted modulated laser light may be compared to the threshold level, and the time between a first threshold crossing and a second threshold crossing may be determined. The output waveform may be counted over a fixed period of time to determine the time between beats, and therefore provide a measure of the relative velocity.

The threshold detector may consist of an operational amplifier, a comparator, or any electronic circuit that can provide an output based on the relative amplitude of two inputs. The threshold detector may include a Schmidt trigger or other suitable circuitry that minimizes false threshold crossings due to excessive noise on the input signal. The threshold detector level may be set such that clean signals are obtained over a wide range of reflected light signals. The threshold detector level may be dynamically set to account for gradual variations in signal strength from the target object.

Figure 4:
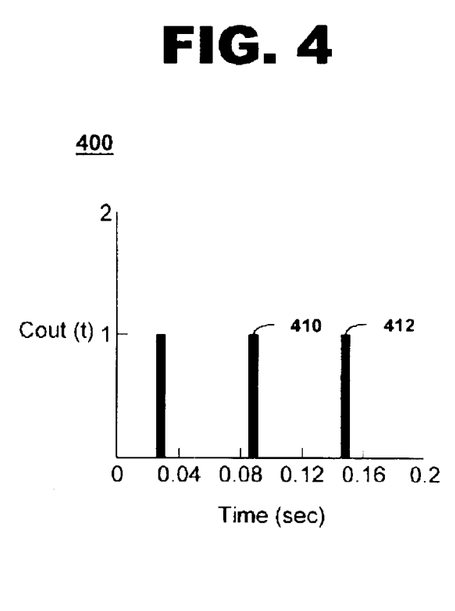
FIG. 4 shows a graph of an output from a CMOS camera with integral laser ranging and velocity measurement, in accordance with one embodiment of the current invention.

FIG. 4 shows a graph of an output from a CMOS camera with integral laser ranging and velocity measurement capability, in accordance with one embodiment of the present invention at 400. Camera output 400 shows a typical output that may occur when a reference portion of a 500 MHz intensity-modulated laser pulse with a target distance of 30 meters and a relative velocity of 10 meters per second is mixed with a reflected portion of the modulated laser pulse from the target object. Pulses 410 may be generated when the signal from the imaging array exceeds a threshold level. A subsequent pulse 412 may be used to determine the beat frequency. The relative velocity between the source and the target object is proportional to the beat frequency, such that a higher beat frequency corresponds to a larger relative velocity.

Figure 5:
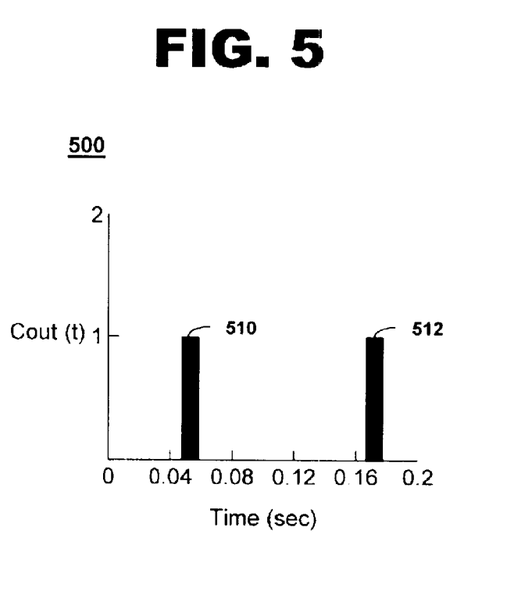
FIG. 5 shows another graph of an output from a CMOS camera with integral laser ranging and velocity measurement, in accordance with one embodiment of the current invention.

FIG. 5 shows another graph of an output from a CMOS camera with integral laser ranging and velocity measurement, in accordance with one embodiment of the present invention at 500. Camera output 500 shows exemplary output from the camera when a laser light source modulated at 500 MHz is mixed or combined with a reflected signal from a target object at a distance of 30 meters and a relative velocity of 5 meters per second, corresponding to about 1 mile per hour. The output pulses 510 may wider and separated further from adjacent pulses 512 than for the earlier case of 10 meters per second relative velocity. The relative velocity between the source and the target object may be determined from the beat frequency.

Figure 6:
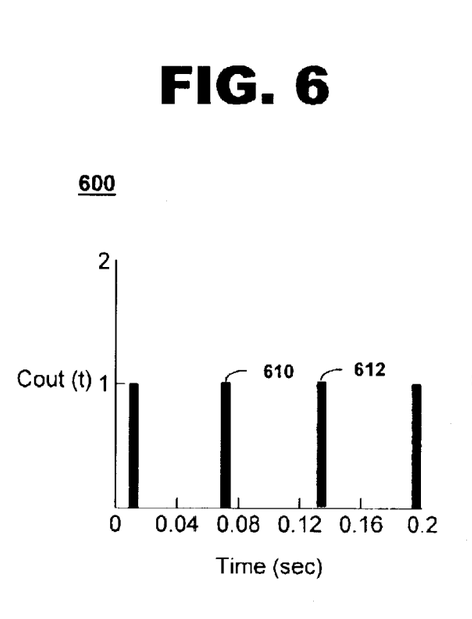
FIG. 6 shows another graph of an output from a CMOS camera with integral laser ranging and velocity measurement, in accordance with one embodiment of the current invention.

FIG. 6 shows another graph of an output from the CMOS camera, in accordance with one embodiment of the present invention at 600. Camera output 600 shows exemplary output from the camera when a reference portion of a laser light pulse that is modulated at 500 MHz is combined with a reflected portion of the laser light pulse from a target object, where the relative distance between the source and the target object is 150 meters, and the relative velocity is 10 meters per second, as shown earlier in camera output 400. As can be seen by comparing the waveforms from camera output 400 and camera output 600, the time between consecutive pulses such as between pulse 610 and subsequent pulse 612 is the same, indicating the same relative velocity, though the phase between the waveforms is shifted. Distance or ranging information may be obtained from the phase information, or from a time-of-flight measurement between the leading edge of the reference laser light pulse and the leading edge of the reflected laser light pulse. Distance information may also be obtained from the time to the first threshold crossing, with a shorter time corresponding to a nearer target object when the reference signal and the reflected signal are added. Alternatively, a shorter time for the threshold crossing may correspond to a further target object when the reference signal and the reflected signal are subtracted.

Figure 7:
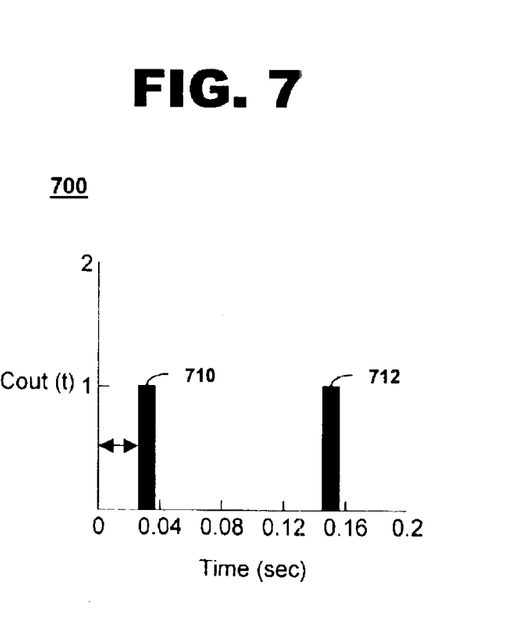
FIG. 7 shows another graph of an output from a CMOS camera with integral laser ranging and velocity measurement, in accordance with one embodiment of the current invention.

FIG. 7 shows another graph of an output from a CMOS camera with integral laser ranging and velocity measurement, in accordance with one embodiment of the present invention at 700. Camera output 700 may be generated when a reference portion of a laser light pulse modulated at 500 MHz is combined with a reflected portion of the laser light pulse from a target object, for the case where the relative velocity between the camera and the target object is 5 meters per second, and the target distance is 150 meters. The time between output pulse 710 and output pulse 712 may be used to determine the relative velocity, and the time from the start of the laser pulse to the leading edge of output pulse 710 may be used to determine the range information. The distance or range information may be determined as a function of the time of the response.

Figure 8:
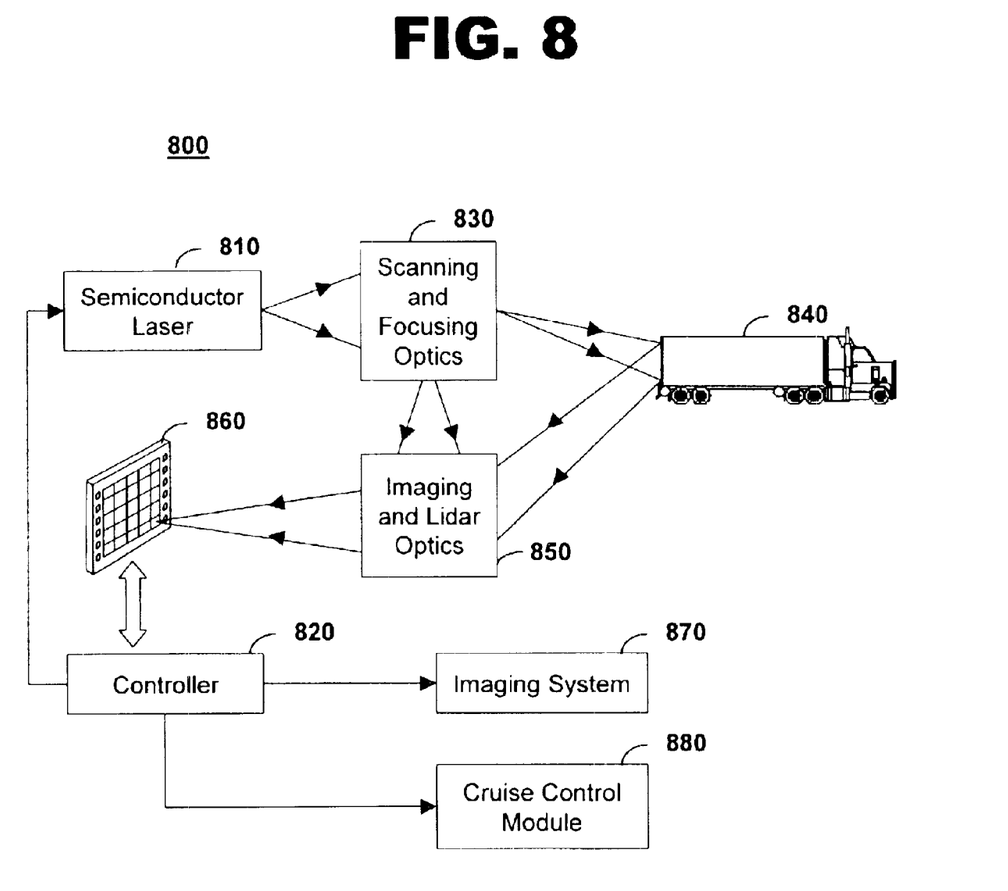
FIG. 8 illustrates a block diagram of one embodiment of an adaptive cruise control for a mobile vehicle, in accordance with the current invention.

FIG. 8 shows a block diagram of one embodiment of an adaptive cruise control for a mobile vehicle, in accordance with the present invention at 800. Adaptive cruise control 800 may include a semiconductor laser 810, a controller 820, scanning and focusing optics 830, a target object 840 such as a truck or car, imaging optics 850, a imaging array 860, an imaging system 870, and a cruise control module 880.

Light from semiconductor laser 810 may be pulsed and modulated. Controller 820 may be used to control the pulses and modulation of the laser. The light from semiconductor laser 810 may be focused and optionally scanned with scanning and focusing optics 830. Scanning may be used to direct the emitted laser pulse towards a target object at one or more predefined angles or locations. Any suitable conventional scanning mechanism may be used, such as a multi-sided rotary scanner. The emitted light may be reflected from the target object, such as from a reflector, license plate, shiny metallic feature, or any feature on the target object that may reflect the laser light.

Imaging optics 850 may be used to focus the reflected laser light from the target object onto a portion of imaging array 860. The focused laser light may be focused onto a single pixel of the imaging array, on a group of pixels, or onto the entire array. Imaging optics 850 may also direct a reference portion of the emitted laser pulse onto imaging array 860 to combine with the reflected portion.

Imaging array 860 may contain individually addressable pixels. Specific pixels may be used to detect the optical signal from the combined reference and reflected portions of the modulated laser pulse. The output from the selected pixels may be analyzed to determine range and relative velocity information. Imaging array 860 may provide detector output and imaging output to controller 820.

Controller 820 may be used to extract signals from one or more pixels and to analyze the signals. Controller 820 may contain image processing software and pattern recognition software to associate, for example, distance and relative velocity information with relevant objects.

Output from imaging array 860 and controller 820 may be provided to imaging system 870. Imaging system 870 may provide visual imagery of the target object and surrounding features. Imaging system 870 may provide relative velocity information at one or more points on the target object and surrounding features, allowing the user the option of seeing the target object and the surrounding features and to know the relative velocity and distance at selected points on the target object and surrounding features. Alternatively, or in addition to providing image output, relative velocity output or distance output, controller 820 may send a relative velocity signal to cruise control module 880. Cruise control module 880 may be any suitable vehicle speed controller for setting and maintaining a preferred speed of the mobile vehicle. The relative velocity signal may be communicated to the cruise control module through, for example, a vehicle communication bus or through a wired connection from the controller. The relative velocity signal may be used to adjust the vehicle speed.

Figure 9:
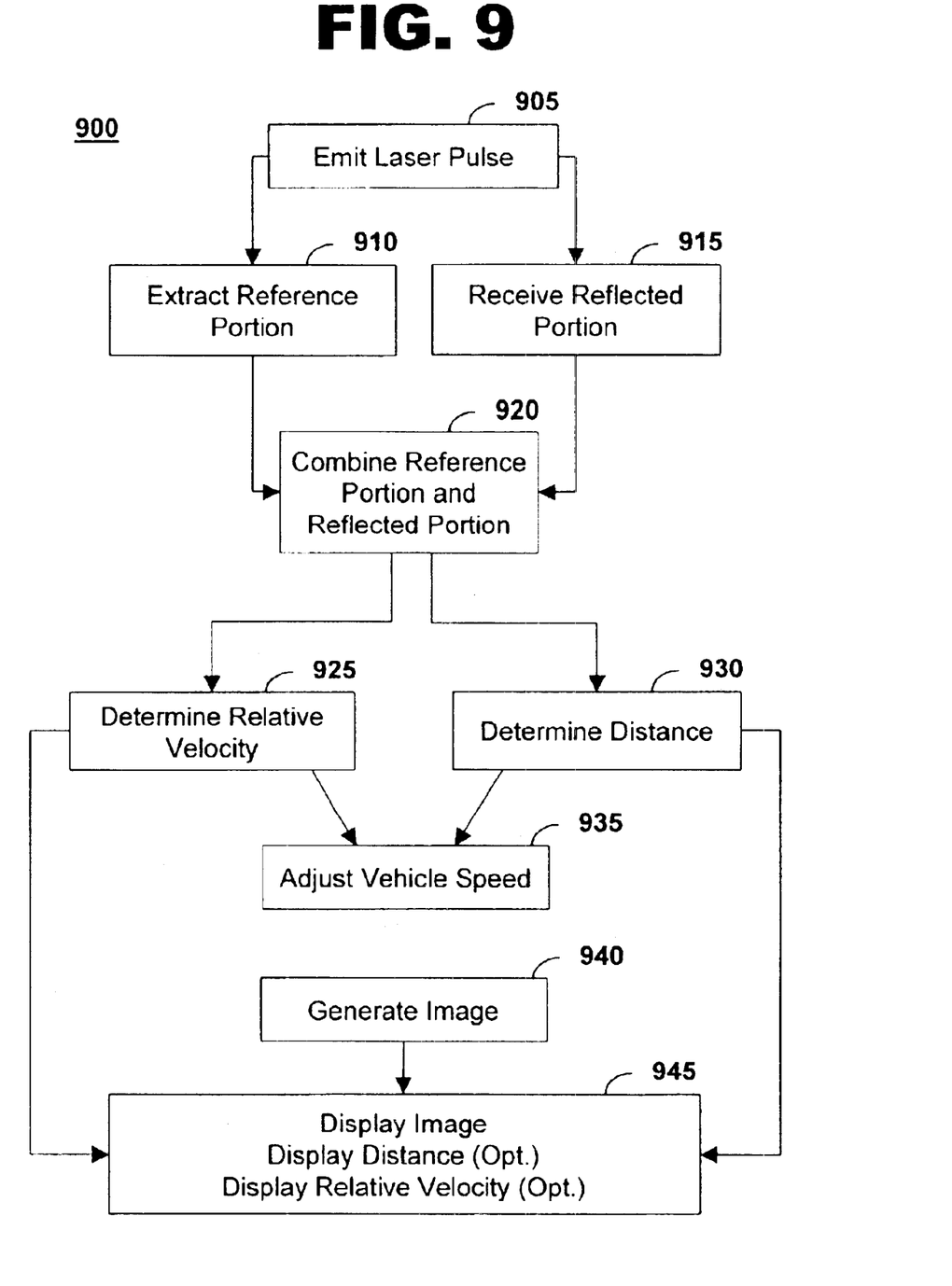
FIG. 9 illustrates a block diagram of a method for adjusting vehicle speed, in accordance with the current invention.

FIG. 9 shows a block diagram of a method for adjusting vehicle speed, in accordance with the present invention at 900. Vehicle speed adjustment method 900 may begin with an in-vehicle laser emitting a modulated laser pulse, as seen at block 905. A reference portion of the emitted modulated laser pulse may be extracted using a partially reflective mirror, an optical fiber, an optical waveguide, an optical grating, or other extractive optical element, as seen at block 910. The modulated laser pulse may be directed towards a target object, and a reflected portion of the emitted modulated laser pulse may be received at the in-vehicle unit, as seen at block 915. The reflected portion of the emitted modulated laser pulse and the reference portion of the emitted modulated laser pulse may be combined on a portion of an imaging array, as seen at block 920. A determination may be made of the relative velocity based on the combined reflected portion and reference portion, as seen at block 925.

Relative velocity information may be used to generate a relative velocity signal. The relative velocity signal may be communicated to an in-vehicle cruise control module, and the vehicle speed may be adjusted, as seen at block 935.

Range or distance information may be determined based on the combined reflected portion and reference portion, as seen at block 930. The vehicle speed may be adjusted up or down based on the distance determination, as seen at block 935.

The imaging array may also be used to generate an image of the target object and surrounding features, as seen at block 940. The generated image may be displayed on a monitor, flat-panel display, liquid-crystal display (LCD) or other suitable user interface. Relative velocity information and distance or ranging information may also be displayed, as seen at block 945.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of adjusting vehicle speed, comprising:
   generating an image of a view in front of the vehicle on a portion of an imaging array;
   identifying a target object;
   confirming from the image that the target object is associated with another vehicle;
   emitting a modulated laser pulse;
   directing the emitted laser pulse at the target object;
   extracting a reference portion of the emitted modulated laser pulse;
   receiving a reflected portion of the emitted modulated laser pulse on a portion of the imaging array from the target object;
   combining the reflected portion with the reference portion on a portion of an imaging array;
   determining a relative velocity based on the combined reflected portion and reference portion; and
   adjusting the speed of the vehicle relative to the target object.

2. The method of claim 1 wherein the reference portion of the emitted modulated laser pulse is extracted with an extractive optical element selected from the group consisting of a partially reflective mirror, an optical fiber, an optical waveguide, and an optical grating.

3. The method of claim 1 wherein the directing step includes using an optical scanner to maintain the emitted pulse on the target object.

4. The method of claim 1 wherein the imaging array comprises an addressable CMOS photodetector array.

5. The method of claim 4 wherein an integration time of the CMOS photodetector array is controllable.

6. The method of claim 4 wherein a frame rate of the CMOS photodetector array is adjustable.

7. The method of claim 1 further comprising:
   comparing the combined reflected portion and reference portion to a threshold level; and
   determining the time between a first threshold crossing and a second threshold crossing.

8. The method of claim 1 further comprising:
   determining a distance based on the combined reflected portion and reference portion, and
   wherein the adjusting step includes adjusting the vehicle speed based on the distance determination.

9. The method of claim 1 wherein the adjusting step includes adjusting the vehicle speed based on the relative velocity determination.

10. A system for adjusting vehicle speed, the system comprising:
    an imaging array for generating an image of a view in front of the vehicle;
    a target object to reference vehicle speed from the target object associated with another vehicle, the target object for imaging by the array;
    a laser range finder circuit coupled with the imaging array, the laser range finder circuit using the imaging array to range-find the target object by emitting a modulated laser pulse; directing the emitted laser pulse at the target object; extracting a reference position of the emitted modulated laser pulse; receiving a reflected portion of the emitted modulated laser pulse on a portion of the imaging array from the target object; combining the reflected portion with the reference portion on a portion of an imaging array; and determining a relative velocity based on the combined reflected portion and reference portion; and
    an imaging system coupled to the laser range finder circuit and imaging array, the imaging system identifies the target object, confirms from the image that the target object is associated with another vehicle; steers the emitted laser pulse at the target object, and provides a control signal for adjusting the speed of the vehicle relative to the target object.

11. The system of claim 10 wherein the imaging system compares the combined reflected portion and reference portion to a threshold level; and determines the time between a first threshold crossing and a second threshold crossing.

12. The system of claim 10 wherein the imaging system determines a distance based on the combined reflected portion and reference portion, and provides a control signal to adjust the vehicle speed base on the distance determination.

13. The system of claim 10 further comprising an optical scanner coupled with the laser range finder and imaging system, the optical scanner for maintaining the emitted pulse on the target object.

14. The system of claim 10 wherein the imaging system provides a control signal to adjust the vehicle speed based on the relative velocity determination.

15. The system of claim 10 wherein the imaging array comprises an addressable CMOS photodetector array.

* * * * *